(12) United States Patent
Kipper et al.

(10) Patent No.: US 8,296,704 B1
(45) Date of Patent: Oct. 23, 2012

(54) METHOD AND APPARATUS FOR SIMULTANEOUS SWITCHING NOISE OPTIMIZATION

(75) Inventors: Michael Howard Kipper, Thornhill (CA); Joshua David Fender, East York (CA); Navid Azizi, Markham (CA); David Samuel Goldman, Thornhill (CA)

(73) Assignee: Altera Corporation, San Jose, CA (US)

( * ) Notice: Subject to any disclaimer, the term of this patent is extended or adjusted under 35 U.S.C. 154(b) by 284 days.

(21) Appl. No.: 12/833,797

(22) Filed: Jul. 9, 2010

(51) Int. Cl.
*G06F 17/50* (2006.01)
(52) U.S. Cl. ........................................ 716/115
(58) Field of Classification Search ............ 716/115
See application file for complete search history.

(56) References Cited

U.S. PATENT DOCUMENTS

| | | | |
|---|---|---|---|
| 5,481,555 A | 1/1996 | Wade et al. | |
| 7,330,051 B1 * | 2/2008 | Huang et al. | 326/38 |
| 7,468,616 B1 * | 12/2008 | Kondapalli et al. | 326/82 |
| 7,523,430 B1 | 4/2009 | Patel | |
| 7,728,630 B1 * | 6/2010 | Ren et al. | 326/86 |
| 2010/0005435 A1 | 1/2010 | Breiland et al. | |

OTHER PUBLICATIONS

International Search Report (PCT/US2011/043402), dated Dec. 27, 2011.
Azizi et al, "Incorporating SSN Analysis in Constraint-Based System Design", Feb. 2009, Design Con.
Fung et al., "Simultaneous Short-Path and Long-Path Timing Optimization for FPGAs", Proceedings of the 2004 IEEE/ACM International conference on Computer-aided design.

* cited by examiner

*Primary Examiner* — Jack Chiang
*Assistant Examiner* — Brandon Bowers
(74) *Attorney, Agent, or Firm* — Womble Carlyle Sandridge & Rice, LLP (57) ABSTRACT

Methods and apparatus for reducing simultaneous switching noise (SSN) in an integrated circuit (IC) designed with a computer aided design (CAD) tool are presented. In one method, value assignments for parameters of the IC are received by the CAD tool. The value assignments are entered as a range of value assignments or as a list of possible value assignments. Further, the method includes an operation for determining the minimum and the maximum path delays for each Input/Output (I/O) pin in an I/O block such that the received value assignments are satisfied. The actual switching times of the I/O pins are spread out in time to decrease SSN in the I/O pins. The switching times are spread out so that the switching times fall between the minimum and the maximum path delay for the corresponding I/O pin. Additionally, other method operations are included for routing paths to the I/O pins to meet the actual switching times and for creating a design for the IC that meets the actual switching times.

20 Claims, 9 Drawing Sheets

Earliest Deadline First Algorithm

Time Smearing using Routing Cost Valleys

METHOD AND APPARATUS FOR SIMULTANEOUS SWITCHING NOISE OPTIMIZATION

CROSS REFERENCE TO RELATED APPLICATIONS

This application is related to U.S. patent application Ser. No. 12/557,798, filed Sep. 11, 2009, and entitled "REDUCING SIMULTANEOUS SWITCHING NOISE IN AN INTEGRATED CIRCUIT DESIGN DURING PLACEMENT"; and U.S. application Ser. No. 12/034,400, filed on Feb. 20, 2008, and entitled "SIMULTANEOUS SWITCHING NOISE ANALYSIS USING SUPERPOSITION TECHNIQUES," which are incorporated herein by reference.

BACKGROUND

Simultaneous Switching Noise (SSN) is defined as a noise voltage induced onto a single victim Input/Output (I/O) pin of an electronic component due to the switching behavior of other aggressor I/O pins in the device. This noise is considered in the context of either an output I/O driver victim or an input I/O buffer victim.

The optimization of SSN in a Field Programmable Gate Array (FPGA) design is a multi-dimensional optimization problem. Current optimization techniques are manual and highly iterative. These iterations can take a prohibitively long time due to the nature of signoff SSN analysis tools. Additionally, the design process does not give the Computer Aided Design (CAD) tool enough information and flexibility to perform many of these optimizations without user intervention, thus increasing design time and less-than optimal quality of results.

It is in this context that embodiments of the invention arise.

SUMMARY

Embodiments of the present invention provide methods and systems for reducing Simultaneous Switching Noise (SSN) in an Integrated Circuit (IC) designed with a Computer Aided Design (CAD) tool.

It should be appreciated that the present invention can be implemented in numerous ways, such as a process, an apparatus, a system, a device or a method on a computer readable medium. Several inventive embodiments of the present invention are described below. In one embodiment, value assignments for parameters of the IC are received by the CAD tool. The value assignments are entered as a range of value assignments or as a list of possible value assignments. Further, the method includes an operation for determining the minimum and the maximum path delays for each Input/Output (I/O) pin in an I/O block such that the received value assignments are satisfied. The actual switching times of the I/O pins are spread out in time to decrease SSN in the I/O pins. The switching times are spread out so that the switching times fall between the minimum and the maximum path delay for the corresponding I/O pin. Additionally, other method operations are included for routing paths to the I/O pins and for creating a design for the IC that meets the actual switching times. In another embodiment, the method operations are performed by a computer program when executed by one or more processors, the computer program being embedded in a non-transitory computer-readable storage medium.

In another embodiment, a method for reducing SSN in an IC designed with a CAD tool is provided. The method includes an operation for receiving value assignments for parameters of the IC, where the value assignments are received as a range of value assignments or as a list of value assignments. Further, the desired switching times for each I/O pin are determined in order to satisfy the value assignments. In another method operation, budgeted minimum and maximum path delays are assigned for each I/O pin based on the desired switching time for each I/O pin. Additionally, the method includes operations for routing paths to the I/O pins to meet the budgeted minimum and maximum path delays, and for creating a design for the IC. The method operations are performed by a processor.

In yet another embodiment, a method for reducing SSN in an IC designed with a CAD tool is presented. The method calculates the desired switching times for each I/O pin in an I/O block, and determines which pin is associated with each desired switching time. The determination is made in the order of the desired switching times. To determine each pin, the method checks if there is at least one candidate pin such that the desired switching time falls between the minimum and the maximum path delay for the candidate pin. Candidate pins are those pins that are unselected, i.e., not associated with a desired switching time. If there is at least one candidate pin, then the method selects the pin that has the lowest maximum path delay from the candidate pins that meet the condition that the pin can switch at the desired switching time. Alternatively, if no candidate pin meets the condition, then the method selects the pin with the lowest maximum path delay from the candidate pins. Further, the method includes an operation for setting the switching time for each pin. The switching time is set to be the closest time to the desired switching time that falls between the minimum and the maximum path delay for the pin. The method operations are performed by a processor.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which.

DETAILED DESCRIPTION

The following embodiments describe methods and apparatus for reducing Simultaneous Switching Noise (SSN) in an Integrated Circuit (IC) designed with a Computer Aided Design (CAD) tool. The SSN reduction is performed with the CAD tool in different ways, such as enabling flexible constraint entry to the flow, modifying the fitter in the CAD tool to optimize SSN automatically, etc. The output of the CAD flow is a design for the IC with significantly improved SSN performance when compared to a non-optimized flow. The SSN performance improvement does not impact other quality-of-results (QOR) performance metrics and does not require user intervention, although user intervention is also enabled in some embodiments. Specifying design constraints that approach actual parameter values allows the CAD tool to design an IC with lower SSN.

It will be obvious, however, to one skilled in the art, that the present invention may be practiced without some or all of these specific details. In other instances, well known process operations have not been described in detail in order not to unnecessarily obscure the present invention.

Figure 1:
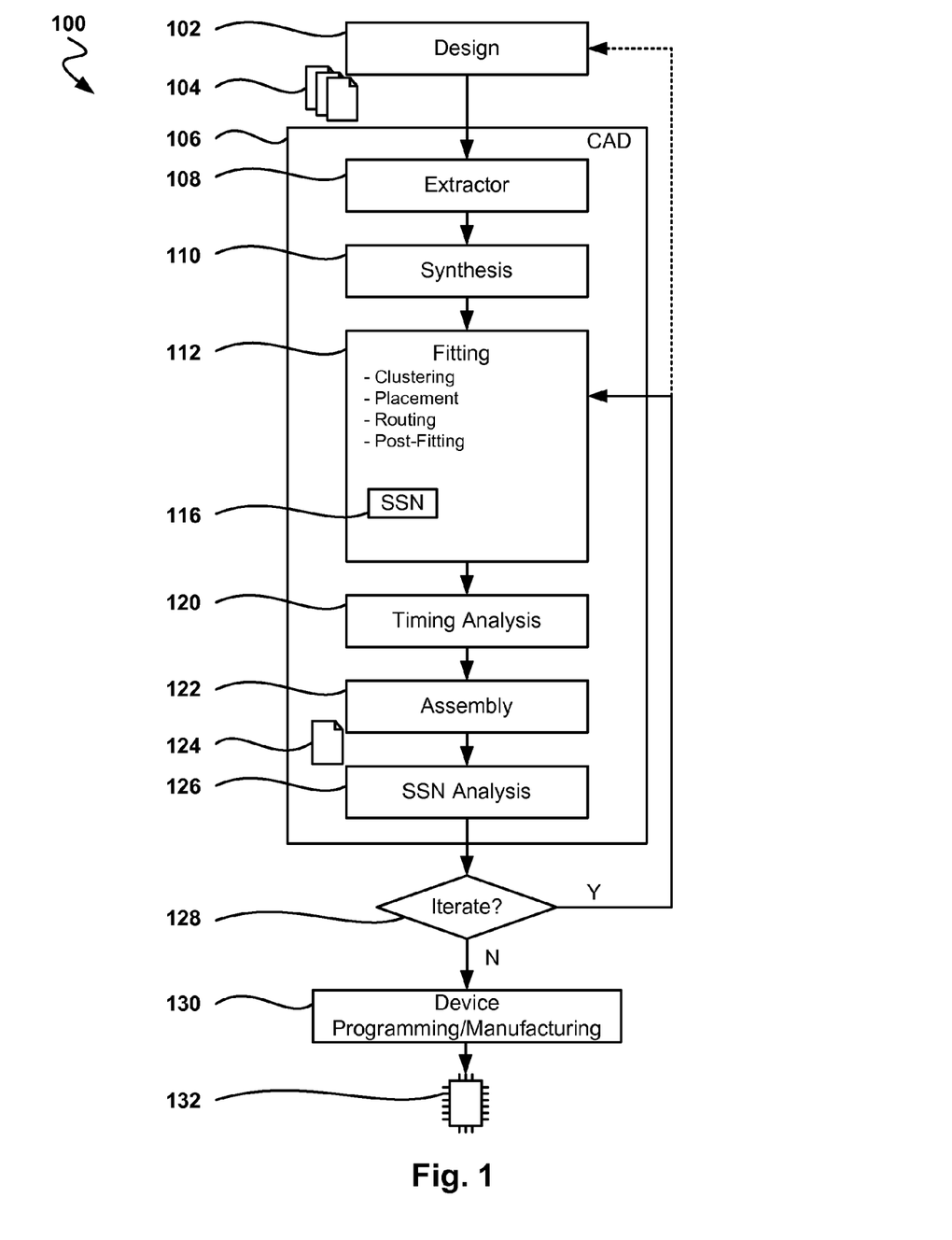
FIG. 1 illustrates the method operations required to program or manufacture an Integrated Circuit (IC) using a Computer Aided Design (CAD) tool in accordance with one embodiment of the invention.

FIG. 1 illustrates the method operations required to program or manufacture IC 132 using CAD tool 106 in accordance with one embodiment of the invention. The process starts with design 102 where a hardware engineer creates Hardware Description Language (HDL) files 104 containing the desired circuitry description. HDL files are used by CAD tool 106 to create the IC design. The first operation of CAD tool 106 is performed by extractor 108 by parsing HDL files 104 and creating a basic discrete netlist of logic-gate primitives. After extractor 108, synthesis 110 optimizes the basic netlist.

Fitting 112 is the process of placing architecture specific blocks onto the device and connecting them properly. Embodiments of the invention improve the fitting 112 stage to reduce SSN 116. The fitting stage can be further broken into several discrete components: clustering, placement, routing and post-fitting. Embodiments of the invention improve the routing stage of the fitter, but changes are also contemplated in earlier stages to enable the optimizations in the router.

Clustering takes a number of small blocks and puts them into clusters so following improvements are done at a cluster level. For example, a register associated with an Input/Output (I/O) pin may be clustered with the I/O pin. If the I/O pin were moved to improve SSN, the associated register would move with the I/O pin because of the clustering.

The placement module starts with a legal non-optimized placement and attempts to move or swap blocks in that placement in an attempt to improve device performance. These moves can either be directed to improve a specific region, path, or metric, or the moves can be generated at random. Each move is evaluated by calculating the cost of performing the move, and if the cost is favorable then the move is accepted. This process of moving pins and estimating cost is repeated until the placement module determines the end of the block-moving process.

In many CAD tools, placement uses a technique called Simulated Annealing (SA). Simply put, the placer uses a greedy algorithm to place the blocks in legal locations. Beginning with this legal placement, the placer proposes moves of these blocks and evaluates the cost of performing such a move. The placer then chooses to accept or reject each move based on the cost, accepting beneficial moves always and accepting detrimental moves with declining probability. In one embodiment, detrimental moves are randomly accepted to avoid getting stuck in local minimums.

Many cost metrics can be considered by the placement module. These cost metrics may include a measure of area, timing, power or some other performance metric that the system wants to improve. A person skilled in the art will appreciate that although the embodiments presented herein describe an SSN cost, other types of cost are evaluated during placement.

Routing adds all wires needed to properly connect all of the placed components while obeying all design rules. The router is interested in routing connections with the minimum amount of wire while satisfying timing constraints like setup and hold time. Commercial routers tools also attempt to optimize other performance metrics simultaneously, such as power consumption.

Since paths may have slack in both setup and hold time, there exists room for adjustments by the router when routing a connection. The spread between the minimum and the maximum delay for a path is called the delay budget. For the data path, the minimum delay is the delay at which point going faster would cause a hold violation and the maximum delay is the point at which going slower would cause a setup violation. For the clock path, the opposite is true.

During Post-Fitting decisions that depend on exact timing are made. Since the exact timing could not be known until a design was routed, decisions made before this point were estimates. In post-fitting, the I/O delay chains are set to fix any issues with timing and skew. Further, sign-off timing and power analysis are performed and the post-fit design can be verified against the post-synthesis netlist. These verification operations are optional. Timing analysis 120 computes the path lengths in the circuits and estimates how the delays relate to the constraints of the circuit. Assembly 122 follows Timing Analysis 120.

SSN Analysis 126 estimates the SSN on I/O pins of the device and makes the results available to the hardware designer. A full SSN Analysis 126 is a computer-resource intensive process that estimates SSN on the I/O pins by analyzing multiple factors such as signal propagation, electrical properties of the circuit, impact by buffers and transmission lines, etc. In operation 128, a decision is made as to whether a new iteration of the design creation is desired, for example to reduce SSN. If a new iteration is desired, the process typically flows back to placement 114 because it is not necessary to re-run Extractor 108 and Synthesis 110 again. In some instances, the design engineer submits small changes to the functionality of a design after the design has been fully compiled. These small changes are commonly referred to as Engineering Change Orders (ECOs), which can result in substantial compile-time savings for small changes to the design by avoiding a full new compilation and by leveraging previous CAD tool calculations. However, if the HDL files 104 are being changed then the process would flow back to design 102 for a complete new iteration. If a new iteration is not desired, the method flows to operation 130 where the device is programmed or manufactured with the created design. IC 132 is produced during the device programming/manufacturing process 130 according to the instructions defined in binary file 124. One skilled in the art will appreciate that any commercially available Electronic Design Automation (EDA) tool may utilize the embodiments described herein.

Figure 2:
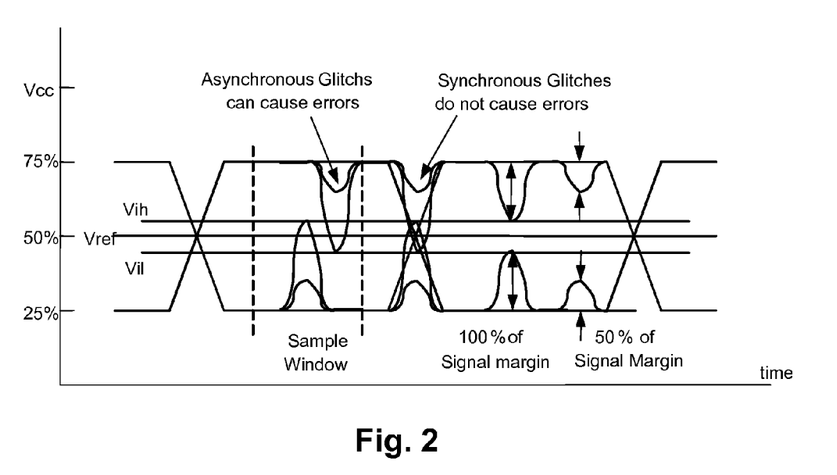
FIG. 2 depicts the effects of noise on a signal and the sensitivity to noise for the different types of interference.

FIG. 2 depicts the effects of noise on a signal and the sensitivity to noise for the different types of interference. Simultaneous Switching Noise is defined as a noise voltage induced onto a single victim I/O pin of an electronic component due to the switching behavior of other aggressor I/O pins in the device. In practice, SSN can be measured as a voltage noise or a timing noise. A voltage noise failure occurs when a SSN event causes a quiet signal to cross over the threshold boundary during a sampling window. Since noise events often occur outside of a sampling window, not all voltage noise failures will result in a functional failure. Therefore, SSN analysis must be aware of timing relationships of pins in order to determine the true noise that could cause a functional failure in a design.

A timing noise failure occurs when an SSN event causes a switching signal to be delayed or accelerated over the threshold boundary, causing the receiver to see the signal later or earlier, respectively. This can cause timing failures by causing signals to violate setup and/or hold time requirements. Glitches can occur outside of the sampling window of a receiver. Typically these noise events are caused by aggressors that are synchronously related to the victim. These noise events can affect the switching time of a victim but should not be considered as an input threshold violation failure.

Switching window techniques are commonly used for reducing pessimism when analyzing on-die cross talk. Published methods fall into two major categories. The first category relates to the problems where the desire is to find the switching time of aggressor buffers such that the noise pulse or timing noise is maximized. The second category relates to the reduction of pessimism using switching window analysis. This problem is significantly different than the first category of work because it deals with multiple layers of logic and interconnects.

Static timing analysis uses a delay model to analyze paths in a circuit to determine if the circuit will function correctly given the user's constraints. If the data arrives before the rising clock edge, then the data is held until some time after the clock edge arrives. The difference between the data arrival and the clock edge is called the setup time and the difference between the clock edge and the time the data is no longer stable is called the hold time. Both setup and hold time must be satisfied for the data to be reliably captured.

There are two clocks that need to be analyzed, the launch clock and the capture clock. The delay from the launch clock to the capture clock is called the required time, and the delay from the launch register to the capture register is called the arrival time. If the arrival time is less than the required time, that difference is called positive slack. If the arrival time is greater than the required time, that difference is called negative slack and indicates a timing failure. In practice, on die variation, temperature variation, model inaccuracies, and other factors can cause the analysis to be inaccurate. If the clock is early, the setup time is compressed and the hold time is elongated, and if the data arrives late, the setup time is further compressed. Therefore, to analyze timing in all conditions, the setup time is defined as the difference between the earliest clock and the latest data, and the hold time is defined as the difference between the latest clock and the earliest data.

All of the timing data is used to create a "delay budget" for a path. A path can function correctly as long as the setup and hold times are positive, i.e., they have positive slack. This slack can be used by the CAD tool to decide how to configure the elements of the path (placement, routing, etc.).

Some methods for SSN Optimization include changing the I/O standard, reducing the current strength or slew rate of the I/O buffer, and spacing out the I/O pins. These methods are performed manually by a design engineer in an iterative fashion. This iteration can take a long time, particularly if the design is complex. Changing the I/O standard is not always an option, depending on the configurability of the receiving device. If, however, the receiving device can be configured to accept a different I/O standard, this may be beneficial in reducing the total SSN in the Field-Programmable Gate Array (FPGA) design. For example, moving to a 1.8-V I/O standard from a 2.5-V I/O standard will reduce the SSN in the design but will affect timing.

Further, the noise injected by a switching output onto a victim pin can be reduced by lowering the current strength of the switching I/O buffer or by lowering the slew rate. Since the SSN performance of the design is highly sensitive to the amount of current sunk by each output, the less current drawn by the output will result in a smaller di/dt profile, thus reducing SSN. Using this method assumes that the device supports programmable current strength or slew rate for the I/O standard.

Mutual inductance between pins is one cause of SSN. Since mutual inductance is inversely proportional to the distance between the pins, the farther an aggressor is from a victim the less noise is injected. To take advantage of this, the pins should be spaced out in such a way so as to reduce the total SSN in the design.

Figure 3:
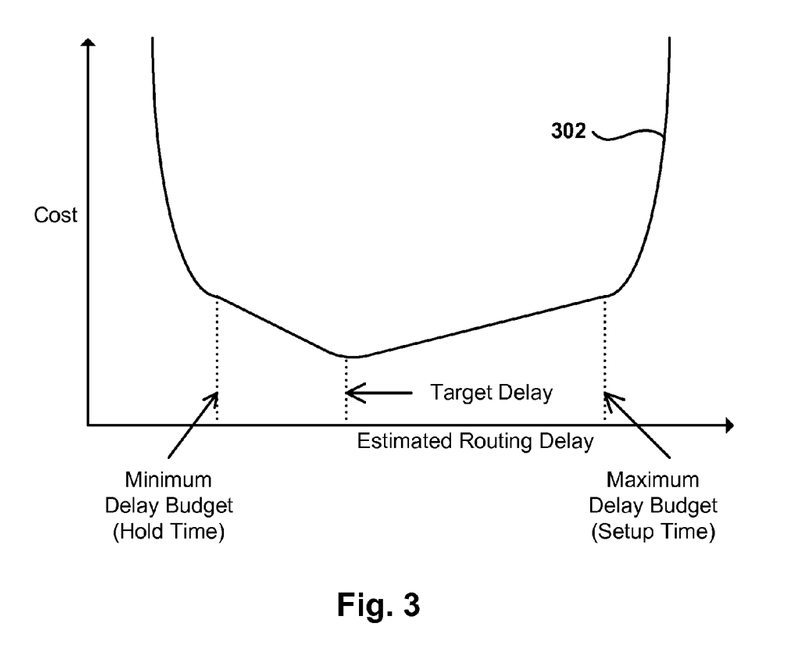
FIG. 3 depicts the Routing Cost Valley (RCV) of a path in the IC, according to one embodiment.

FIG. 3 depicts the Routing Cost Valley (RCV) of a path in the IC, according to one embodiment. In order to optimize both setup and hold times, the router uses a cost curve for each path called routing cost valley 302. The cost is at a minimum at the target delay and has a positive linear slope to the minimum and maximum delays. The slope of the line is called the connection criticality and is computed from the delay budgets. The slope to the left of the target is the short-path connection criticality and the slope to the right is the long-path connection criticality. The slope is between 0 and 1 and indicates the importance that a connection be routed with a large or a small delay, respectively. Any route with more or less delay than the target delay is penalized, because the regions before the minimum delay and after the maximum delay are quadratic regions.

Embodiments of the invention enable the entry of assignments as a list or as a range of possible values rather than limiting the choices to one specific value. For example, an entry to set the slew rate assignment as "Fast" into a CAD tool, such as QUARTUS® II owned by the assignee, is as follows:

$$\text{set\_instance\_assignment-to "pin"-name SLE-W\_RATE "Fast"} \quad (1)$$

Embodiments of the invention allow the user to enter assignments as a list, a range, or other method that allows the CAD tool to vary the setting to optimize performance. For example:

$$\text{set\_instance\_assignment-to "pin"-name SLE-W\_RATE "Any"} \quad (2)$$

$$\text{set\_instance\_assignment-to "pin"-name SLE-W\_RATE "Medfast,Fast"} \quad (3)$$

$$\text{set\_instance\_assignment-to "pin"-name SLE-W\_RATE "Slow . . . Fast"} \quad (4)$$

This makes it explicit to both the CAD tool and the user that changing these values from their defaults is allowed. In equation 2 the value of the SLEW_RATE can be any value, in equation 3 the value can be either Medfast or Fast, and in equation 4 the value can be any value between Slow and Fast.

Figure 4:
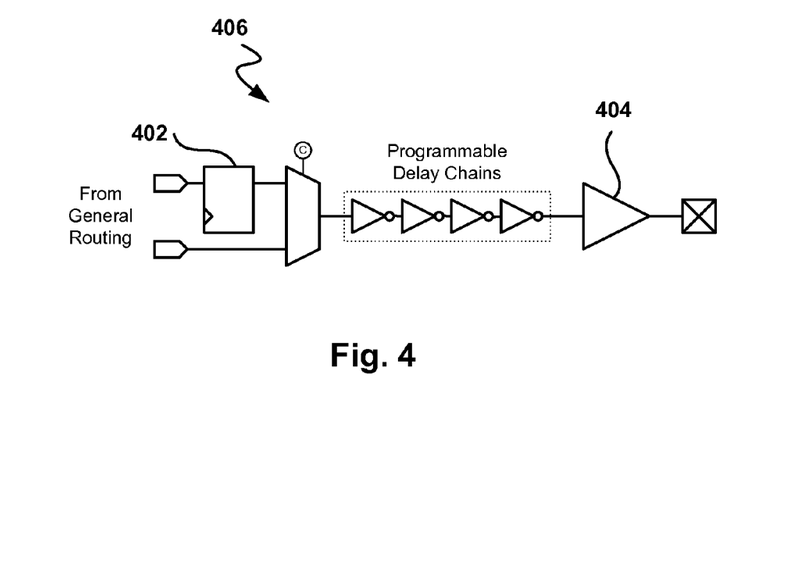
FIG. 4 illustrates an embodiment of a programmable I/O block in the IC.

FIG. 4 illustrates an embodiment of a programmable I/O block in the IC. As previously described, the clustering algorithm groups blocks into larger groups to allow placement to work with a smaller number of blocks. One of these clusters is an I/O register and buffer block 406 as the one in FIG. 4. If output register 402 is packed into the I/O block 406, then register 402 is placed in the I/O to feed I/O buffer 404 directly using dedicated routing resources. In this case, the router can only modify the I/O delay chains to increase the I/O delay, which has less flexibility than using the programmable routing resources on the device.

To give the router flexibility, the clustering algorithm is able to avoid packing the I/O registers into I/O blocks when the algorithm intends on performing time-smearing optimization. This decision is balanced with existing timing constraints to ensure that the decision to not pack an I/O register does not violate any paths.

Because the placer can force certain connections to be routed using dedicated resources (which have a fixed delay), the placement algorithm is modified to ensure that all short-path critical paths have at least one connection to which delay can be added. This ensures that the router has the ability to change the connection delay to avoid short-path timing violations on that path. Additionally, the router ensures that the paths that are to be time-smeared are placed without dedicated resources to allow the router the addition of delay to certain paths.

Figure 5:
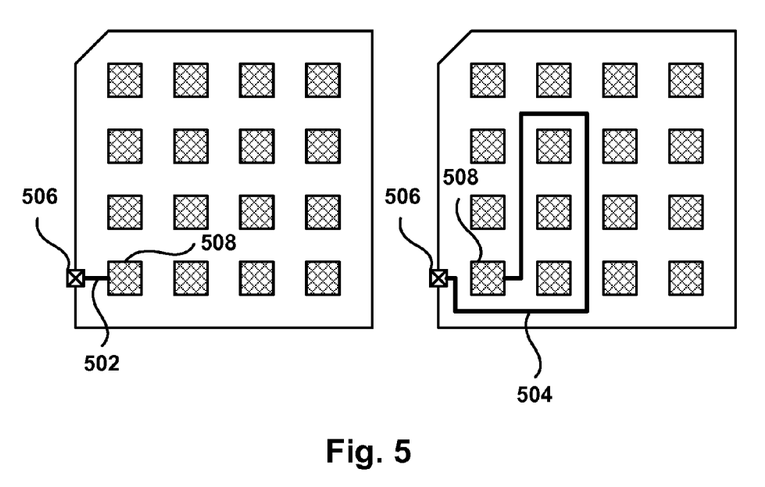
FIG. 5 illustrates alternate techniques for routing a path in an IC with different path delays.

FIG. 5 illustrates alternate techniques for routing a path in an IC with different path delays. The router has flexibility in routing connections between blocks and this can alter the timing behavior of a design. In the example shown in FIG. 5, the router can choose to route the block 508 to I/O buffer 506 directly 502, or the router can choose to take a longer path 504 through more interconnects. The long path 504 results in increased routing delay for the signal to arrive at I/O buffer 506. It is important to note that this could increase congestion in the rest of the circuit and potentially hurt other performance metrics. The router considers this when optimizing paths.

Figure 6A:
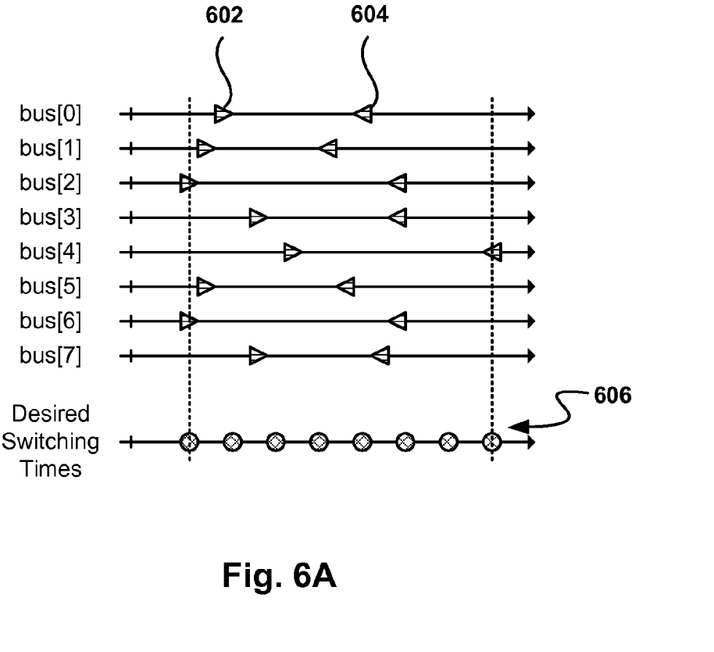
FIGS. 6A-6C illustrate an embodiment of a method for determining I/O pin switching times.
Figure 6B:
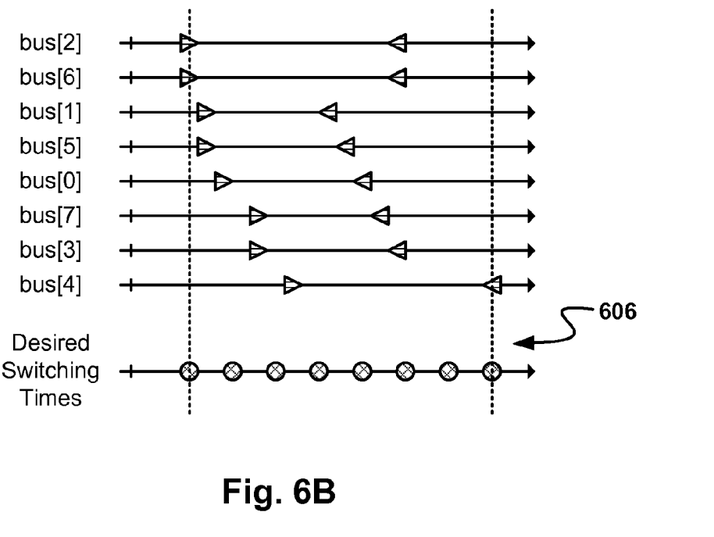
Figure 6C:
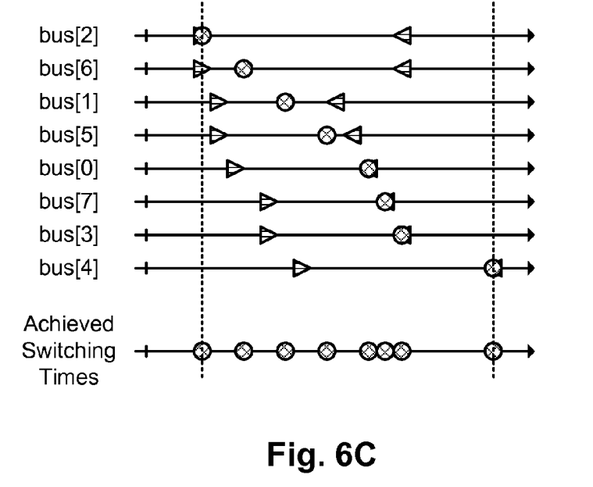

FIGS. 6A-6C illustrate an embodiment of a method for determining I/O pin switching times. The SSN noise effect on a victim pin is the sum of all noise effects of its aggressors. These effects are time varying and are worst-case on a victim when the peak noise of each of its aggressors occurs at the same point in time. Time-smearing, i.e., spreading out in time, the switching time of output pins can reduce SSN by up to 68% or more.

FIG. 6A shows the delay budgets for eight output paths to pins (bus[0]-bus[7]) of a synchronous bus. For each path, the triangle on the left 602 represents the minimum delay and the triangle on the right 604 represents the maximum delay for that path. These delays are derived from the timing constraint on the path, not from the minimum and maximum values in the delay model. Since the termination elements (registers, I/O buffers) are not uniformly placed, the minimum and maximum delay for the individual elements of a synchronous bus are likely different from one another. Therefore, the optimal switching time must be realized by considering all paths in the bus.

Furthermore, the optimal switching time must consider all paths in a clock domain as well as any related clocks. The desired switching times will all be referenced to a global t=0 which is the positive edge time for a single clock. All related clock domains are analyzed with respect to that clock, which can include phase related clocks, negative edge triggered registers, etc. Unrelated clock domains are optimized in isolation.

Figure 7:
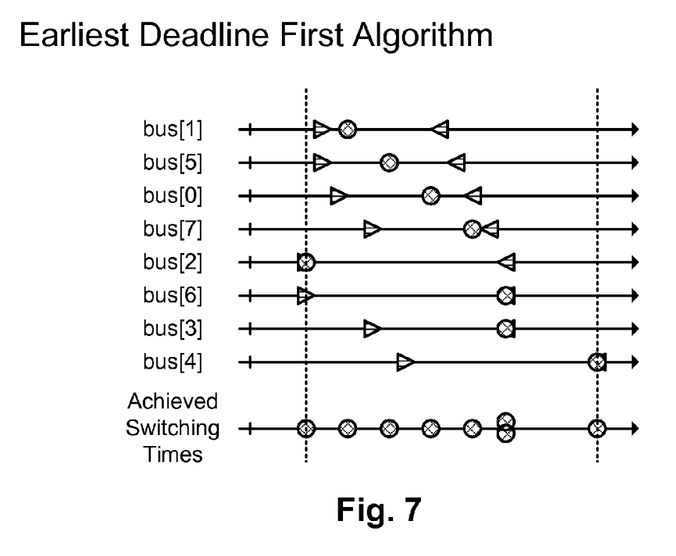
FIG. 7 illustrates a second method for determining I/O pin switching times, according to one embodiment of the invention.

The optimal or desired switching times 606 are determined by taking the minimum achievable delay to any pin and the maximum achievable delay to any pin, and then evenly (linearly) spacing out the switching times between them. The method of FIGS. 6A-6C determines pin switching times that are sub-optimal but the method has linear O(n) time complexity. A second method described below in reference to FIG. 7 is optimal but has worst-case $O(n^2)$ time complexity.

To determine the desired delay for each path, the paths are sorted increasingly by their minimum switching time. The result of the sorting is shown in FIG. 6B. In the next operation shown in FIG. 6C, each pin is assigned a delay in order based on the desired switching times, starting at the top and moving towards the bottom. If the corresponding desired switching time for a path does not fall between the minimum and the maximum path for that pin, then the actual switching time for that pin is set to the value between the minimum and maximum path delay that is closest to the desired switching time. This will cause the actual switching time to be either the minimum or the maximum path delay for that pin. FIG. 6C shows how pins bus[7] and bus[3] could not meet the desired switching time, therefore the achieved switching times for those pins correspond to the maximum path delay for each pin.

The assigned delays are then used in the router to optimize SSN. In another embodiment, a time buffer is provided on each side of the delay budget to allow for more flexibility. For example a time buffer of 100 ps is used in one embodiment, although other values are also possible. Additionally, the buffers on the left and the right side do not have to be the same size. The formula for calculating the desired switching time of an output using time buffers is:

$$t_{switch} = t_b + D_{min} + \left(\frac{D_{max} - D_{min} - t_b}{\text{width}}\right)\text{index} \quad (5)$$

Where $t_{switch}$ is the achieved switching time, $t_b$ is the amount of time used for the buffer, $D_{min}$ is the minimum path delay, $D_{max}$ is the maximum path delay, width is the number of pins in the bus, and index is the index of the desired switching time.

FIG. 7 illustrates a second method for determining I/O pin switching times, according to one embodiment of the invention. This method is based on the Earliest Deadline First (EDF) dynamic scheduling algorithm. The desired switching times for the paths are calculated in the same manner described above in reference to FIG. 6A. The method then determines which pin is associated with each desired switching time, starting with the earliest desired switching time and continuing in order until the latest desired switching time.

For each desired switching time, it is first determined if there is at least one candidate pin where the desired switching time is between the minimum and the maximum path delay for the remaining candidate pins. The candidate pins are those pins that are unselected, i.e., associated with a desired switching time. If there is at least one pin, then the candidate pin that has the lowest maximum path delay from the candidate pins is selected. Otherwise, the candidate pin with the lowest maximum path delay is selected.

The switching time for each pin is set, as in FIG. 6C, as the closest time to the desired switching time that is between the minimum and the maximum path delay for the pin. In one embodiment, the method is performed as follows:

1. Insert each path in a priority queue, sorted by lower maximum path delay.

2. Starting from the top, attempt to schedule each path into a desired switching time, from earliest to latest.
3. If the path's minimum delay is greater than the desired switching time then try to schedule the next paths below if possible. Otherwise, schedule this path. If the desired switching time is greater than this path's maximum delay, then use the maximum delay as the switching time.
4. Continue until all paths have a target switching time.

Figure 8A:
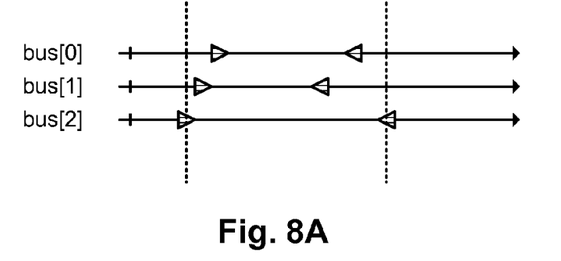
FIGS. 8A-8B illustrate time-smearing optimization using routing delay budgets, according to one embodiment of the invention.
Figure 8B:
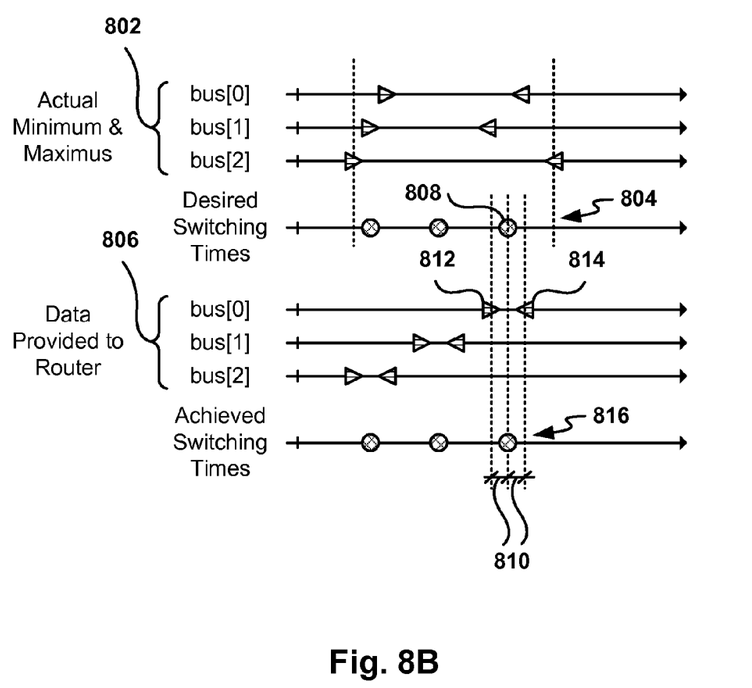

FIGS. 8A-8B illustrate time-smearing optimization using routing delay budgets, according to one embodiment of the invention. To time-smear the outputs using routing delay budgets, the routing delay budgets are changed to center the target switching time in the delay window. The router has less flexibility in routing the path because the routing delay budget is often reduced with the goal of having the path delay as close to the target delay as possible.

FIG. 8A shows the delay budgets for a three-bit bus before any optimization takes place. FIG. 8B illustrates an embodiment with actual minimum and maximum path delays 802 and desired switching times 804. The delay budget for each bit is modified to create a new delay budget 806, which is provided to the router. In one embodiment, the delay budget for each bit is created to center desired switching times 804 in the delay budget. In one embodiment, the same time buffer (e.g. 100 ps) is used on each side of the desired switching time. Thus, if it is desired that bus[0] switches at switching time 808, a delay budget for the router is created around switching time 808. The delay budget for the router is created by making minimum path delay 812 equal to switching time 808 minus time buffer 810, and making maximum path delay 814 equal to switching time 808 plus time buffer 810. The achieved switching times 816 will be almost the same or equal to desired switching times 804.

In another embodiment, only the minimum delay budget is changed and the maximum is left intact. This ensures that the router has still plenty of room to add delay in order to get around congestion, but it has the potential negative effect of allowing the router to add a larger amount of delay and causing the switching time to be further away from the desired switching time.

Figure 9:
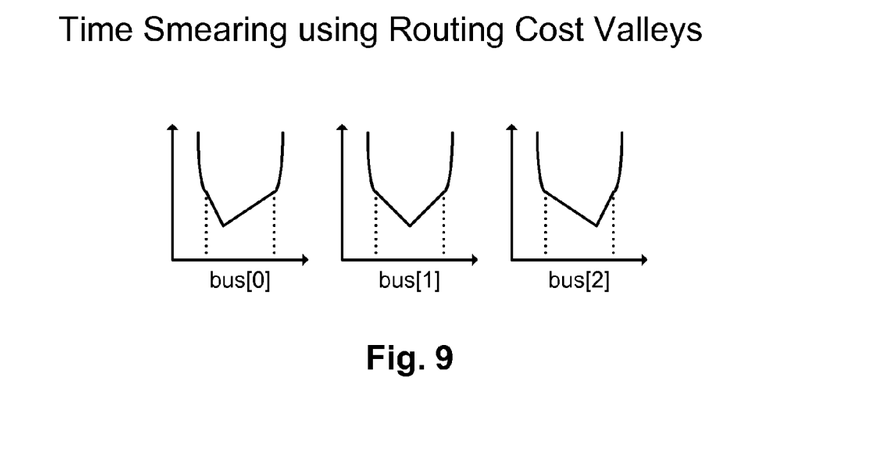
FIG. 9 depicts time-smearing optimization using routing cost valleys, according to one embodiment of the invention.

FIG. 9 depicts time-smearing optimization using routing cost valleys, according to one embodiment of the invention. To time-smear the outputs using routing cost valleys, the target delay is changed without modifying the minimum and maximum delays for the path. The calculation of the default delay target is calculated with the following formula:

$$D_{target} = \min\left(\frac{D_{min} + D_{max}}{2}, D_{min} + t_b\right) \quad (6)$$

Where $D_{target}$ is the target switching time, $D_{min}$ is the minimum path delay, is the maximum path delay, and $t_b$ is the amount of time used for buffering. To minimize SSN, the target delay for the elements of a synchronous bus is set to the target switch time as previously described. The router then estimates that the target delay has the lowest cost path for that output and attempts to optimize for that delay. FIG. 9 illustrates the modified routing cost valleys for three synchronous output paths terminating at a three-bit wide bus. The lowest cost target for the bus is different for each pin, corresponding with the target switch times determined earlier.

After placement is complete, a full signoff timing analysis can be run to get an accurate estimate of the slacks on each path. Then other optimizations are available to improve SSN.

One optimization configures delay chains in the IC. The I/O blocks in FPGAs can have programmable delay chains to provide fine control of delays on the pin. Given timing margin, these slacks can be exploited to time smear the switching times of the outputs in the same way the router does. The delay chains can be used to time-smear paths that are connected with dedicated routing resources, such as I/O register to I/O buffer paths. In general, an attempt is made to avoid auto-packing these registers, however user-assignments and location constraints can prevent the CAD tool from doing so. In these cases, the delay chains are the only way to control the delays of the paths.

In one embodiment, the optimization includes the following operations:
1. Determine desired switching targets, as previously described. In this case, the minimum and maximum delays used are the delays given the minimum and maximum setting of the delay chain. If delay chain settings are specified as ranges, then the ranges are used as the minimum and maximum delays. The ranges may need to be capped at either end if there are timing constraints.
2. Use a time-smear process, such as the ones described in reference to FIGS. 6A-6C and 7. For each path, the delay chain is set to the value that comes closest to that delay without going over.

Since the I/O delay chains are discrete, the delays are bound by the number of settings in the delay chains. Therefore, there may still be smaller groups of I/O pins that switch together.

Another post-placement optimization involves I/O Assignment setting optimization. Once the router and the timing analysis has completed, there is an accurate delay model for the design. If there are any paths with slack on them, the timing of these paths can be degraded for the benefit of SSN performance, while still meeting the user's timing requirements. The method takes advantage of the user-provided assignment-ranges to reduce the SSN on the worst case pins.

The method traverses each of the output pins in the design to assess if there is timing margin available on the path for optimization. If there is margin, the current strength and slew rate settings are progressively lowered within the user's constraints. In addition, a check is made to see if the timing requirements are still met. An incremental timing analysis flow can be used to implement this optimization.

Since this post-fit setting modification happens after the previous time-smearing optimization, all elements of a synchronous bus are modified at the same time to preserve the delay targets optimized in the router. Otherwise, those efforts could be wasted as the settings may cause the switching times to overlap once again. However, it is not necessary to run the time-smearing optimization for this optimization to be effective.

In one embodiment, this optimization is run before the time-smearing optimization in the pre-fitter in order to give more flexibility in consuming margin. Since both optimizations consume margin, if one optimization is better for SSN than the other, that better optimization should be run first. To that end, an estimation flow can be run to evaluate which optimization will yield the best results and then run that one first.

Another post-fitting optimization involves router wire loading for precise delays. Once timing analysis is complete, there is precise delay data for each path. The methods previously described attempt to achieve a desired delay along a path to have the outputs switch optimally for SSN. However, due to discretization in the routing paths available on the FPGA these targets can not be met exactly. If a path has delay of less than the desired switching time, the delay on the path can be potentially increased without changing the functionality of the device.

In one embodiment, the operations to perform this optimization include:
1. Compute the target delays.
2. Fit the design, including the time-smearing techniques previously described. In one embodiment, this includes the delay chain optimizations previously described, assuming that the delay is chosen such that the delay is closest to the target without going over the target.
3. For each path:
   a. Compute the delay that needs to be added to achieve the target delay. If that value is negative, determine if there is opportunity to add delay. If there is, determine if the delay chain setting can be lowered incrementally to allow the addition of loading delay.
   b. Traverse each routing element in the path, and determine if increasing delay on the path is possible. If so, increase the delay and determine how much delay was added. Then subtract that delay from the amount attempting to add to the whole path.
   c. Update the timing graph for any paths that were affected by changes made by this method.

Figure 10:
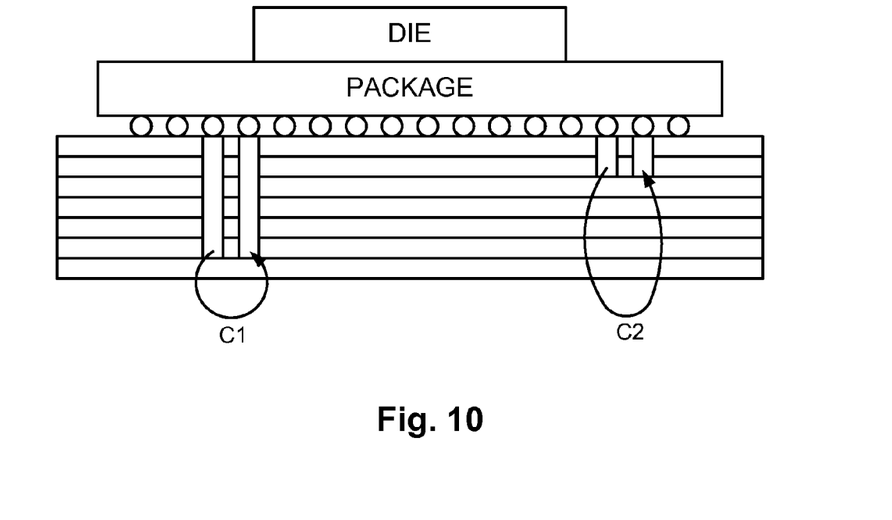
FIG. 10 illustrates via breakout-depth optimization, according to one embodiment of the invention.

FIG. 10 illustrates via breakout depth optimization, according to one embodiment of the invention. After the design is fully constrained and fit, an SSN analysis is run on the design. The QUARTUS II SSN ANALYZER is one such tool that can fully analyze a design and determine the noise on each pin. Once the worst-case pin has been identified, that pin can be made to break out closer to the FPGA die to reduce the SSN noise on that pin. In FIG. 10, inductive capacitance C1 is larger than C2 because the pins in C1 break out further away from the IC than the pins in C2. The CAD flow can advise the user to make this change, but it is up to the board designer to specify this new depth as an input constraint to the analyzer tool.

The operations for this optimization include:
1. Fit the design and run a full SSN analysis.
2. If there are pins in the design that consume more than a certain threshold of margin, make those pins break out closer to the die. In another embodiment, the user is notified in a report that those pins are PCB critical and should be broken out closer to the die.
3. Incrementally re-run SSN analysis with this new configuration.

Figure 11:
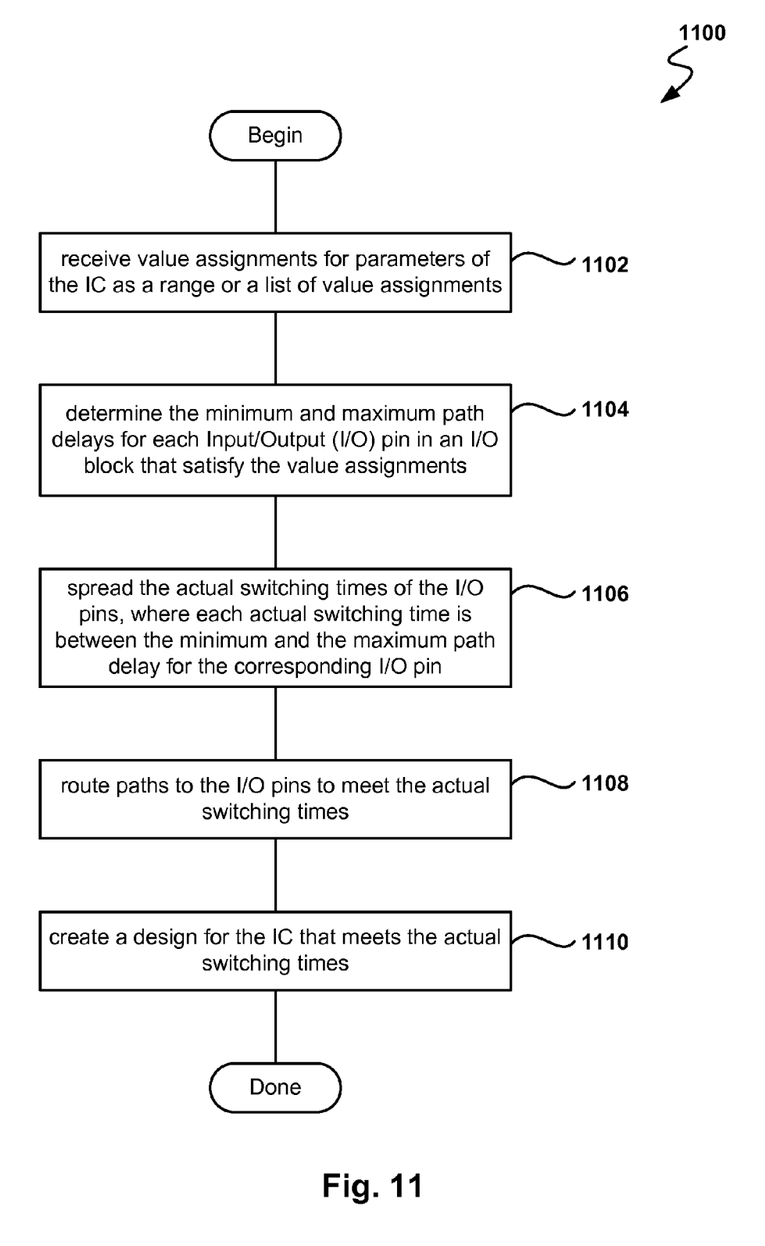
FIG. 11 shows the flow of a method for reducing Simultaneous Switching Noise (SSN) in an IC designed with a CAD tool in accordance with one embodiment of the invention.

FIG. 11 shows the flow of a method for reducing SSN in an IC designed with a CAD tool in accordance with one embodiment of the invention. In operation 1102, the method includes receiving value assignments for parameters of the IC. The value assignments can be received as a range or as a list of possible value assignments. After operation 1102, the method flows to operation 1104 for determining minimum and maximum path delays for each I/O pin in an I/O block that satisfy the value assignments received in operation 1102.

In operation 1106, the actual switching times of the I/O pins are spread out, where each actual switching time is between the minimum and the maximum path delay for the corresponding I/O pin. See FIG. 7 for an example of the application of this method. After operation 1106 the method flows to operation 1108 where paths to the I/O pins are routed to meet the actual switching times. A design for the IC that meets the actual switching times is created in operation 1110. In one embodiment, the method operations are performed by a computer processor.

Figure 12:
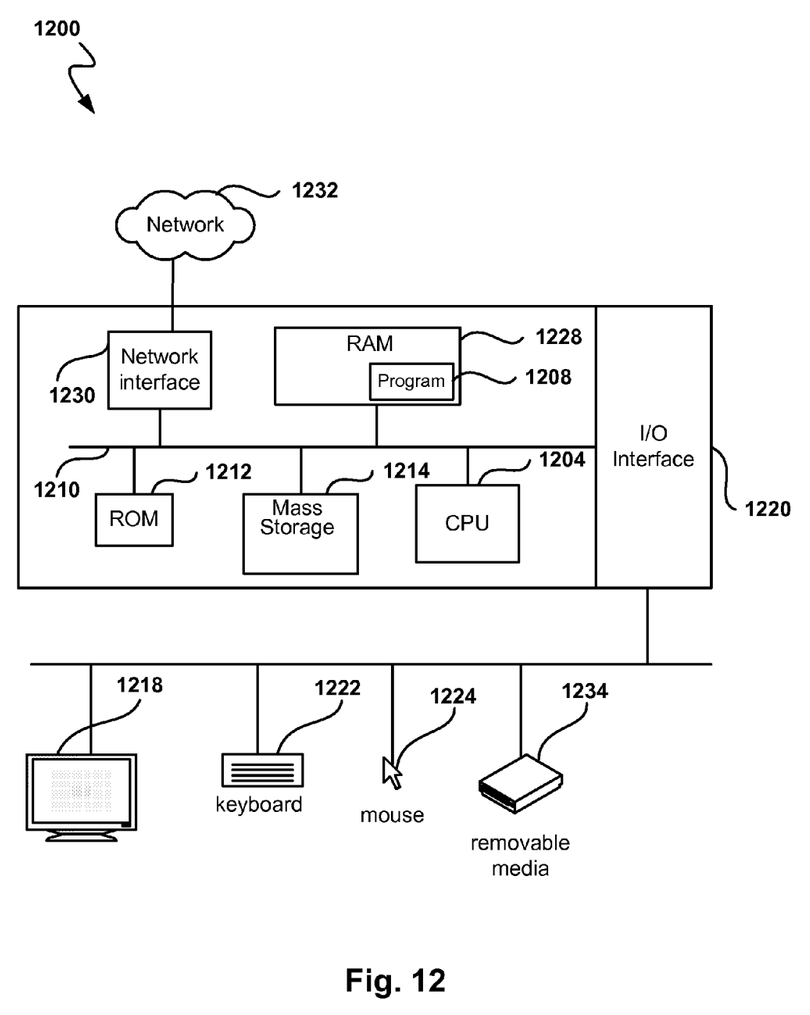
FIG. 12 is a simplified schematic diagram of a computer system for implementing embodiments of the present invention.

FIG. 12 is a simplified schematic diagram of a computer system 1200 for implementing embodiments of the present invention. It should be appreciated that the methods described herein may be performed with a digital processing system, such as a conventional, general-purpose computer system. Special purpose computers, which are designed or programmed to perform only one function may be used in the alternative. The computer system includes a central processing unit (CPU) 1204, which is coupled through bus 1210 to random access memory (RAM) 1228, read-only memory (ROM) 1212, and mass storage device 1214. SSN optimization program 1208 resides in random access memory (RAM) 1228, but can also reside in mass storage 1214.

Mass storage device 1214 represents a persistent data storage device such as a floppy disc drive or a fixed disc drive, which may be local or remote. Network interface 1230 provides connections via network 1232, allowing communications with other devices. It should be appreciated that CPU 1204 may be embodied in a general-purpose processor, a special purpose processor, or a specially programmed logic device. Input/Output (I/O) interface provides communication with different peripherals and is connected with CPU 1204, RAM 1228, ROM 1212, and mass storage device 1214, through bus 1210. Sample peripherals include display 1218, keyboard 1222, cursor control 1224, removable media device 1234, etc.

Display 1218 is configured to display the user interfaces described herein. Keyboard 1222, cursor control 1224, removable media device 1234, and other peripherals are coupled to I/O interface 1220 in order to communicate information in command selections to CPU 1204. It should be appreciated that data to and from external devices may be communicated through I/O interface 1220. The invention can also be practiced in distributed computing environments where tasks are performed by remote processing devices that are linked through a wire-based or wireless network.

The methods and systems for reducing SSN in an IC designed with a CAD tool, described herein, may be incorporated into any suitable integrated circuit. For example, the methods, and systems may be incorporated into other types of programmable logic devices such as programmable array logic (PAL), programmable logic arrays (PLAs), field-programmable gate arrays (FPGAs), field programmable logic arrays (FPLAs), electrically programmable logic devices (EPLDs), electrically erasable programmable logic devices (EEPLDs), logic cell arrays (LCAs), application-specific integrated circuits (ASICs) just to name a few. The programmable logic device may be a part of a data processing system that includes one or more of the following components: a processor, memory; I/O circuitry, and peripheral devices. The data processing system can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data may be processed by other computers on the network, e.g., a cloud of computing resources.

One or more embodiments of the present invention can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for reducing simultaneous switching noise (SSN) in an integrated circuit (IC) designed with a computer aided design (CAD) tool, the method comprising:
   receiving value assignments for parameters of the IC, the value assignments being received as one of a range of value assignments or a list of value assignments;
   determining minimum and maximum path delays for each Input/Output (I/O) pin in an I/O block that satisfy the value assignments;
   spreading actual switching times of the I/O pins, wherein each actual switching time is between the minimum and the maximum path delay for the corresponding I/O pin;
   routing paths to the I/O pins to meet the actual switching times; and
   creating a design for the IC that meets the actual switching times, wherein the method operations are performed by a processor.

2. The method as recited in claim 1, wherein spreading the actual switching times further includes:
   calculating desired switching times for each I/O pin, wherein the desired switching times are linearly distributed between a minimum and a maximum path delay for all the I/O pins.

3. The method as recited in claim 2, wherein spreading the actual switching times further includes:
   sorting I/O pins according to the maximum path delay of each pin;
   selecting one I/O pin at a time based on a corresponding desired switching time until all I/O pins have been selected; and
   determining the switching time for each selected I/O pin.

4. The method as recited in claim 3, wherein selecting one I/O pin includes:
   selecting an I/O pin that has a lowest maximum path delay from candidate pins that can switch at the desired switching time when there is at least one candidate pin where the desired switching time is between a minimum and a maximum path delay for the at least one candidate pin, the candidate pins being those I/O pins that are unselected; and
   selecting an I/O pin with the lowest maximum path delay from the candidate pins when the desired switching time is not between the minimum and the maximum path delay of any candidate pin.

5. The method as recited in claim 4, wherein determining the switching time for each selected I/O pin further includes:
   setting the switching time for the selected I/O pin as a closest time to the desired switching time that is between the minimum and the maximum path delay for the selected I/O pin.

6. The method as recited in claim 2, wherein calculating the desired switching times further includes allowing buffer periods without any I/O pin switching before a first switching time and a last switching time.

7. The method as recited in claim 2, wherein spreading the actual switching times further includes:
   sorting I/O pins according to the minimum path delay of each pin;
   selecting one I/O pin at a time based on the sorting until all I/O pins have been selected; and
   determining the switching time for each selected I/O pin as a closest time to the corresponding desired switching time that is between the minimum and the maximum path delay for the selected I/O pin.

8. The method as recited in claim 1, further including:
   determining paths to the I/O pins that include a time slack; and
   degrading the determined paths to improve SSN performance.

9. The method as recited in claim 1, wherein spreading the actual switching times of the I/O pins is performed during placement and routing phases of the CAD tool.

10. The method as recited in claim 1, wherein the method operations are performed by a computer program when executed by one or more processors, the computer program being embedded in a non-transitory computer-readable storage medium.

11. A method for reducing simultaneous switching noise (SSN) in an integrated circuit (IC) designed with a computer aided design (CAD) tool, the method comprising:
- receiving value assignments for parameters of the IC, the value assignments being received as one of a range of value assignments or as a list of value assignments;
- determining desired switching times for each I/O pin that satisfy the value assignments;
- assigning budgeted minimum and maximum path delays for each I/O pin based on the desired switching time for each I/O pin;
- routing paths to the I/O pins to meet the budgeted minimum and maximum path delays; and
- creating a design for the IC, wherein the method operations are performed by a processor.

12. The method as recited in claim 11, wherein assigning budgeted minimum and maximum path delays further includes:
- setting the minimum path delay as the desired switching time minus a first predetermined period of time; and
- setting the maximum path delay as the desired switching time plus a second predetermined period of time.

13. The method as recited in claim 12, wherein determining the desired switching times further includes:
- setting the desired switching time for a pin as a minimum of an average of the minimum and the maximum path delay and of the minimum path delay plus the first predetermined period of time.

14. The method as recited in claim 11, further including:
- determining critical paths to I/O pins; and
- providing at least one connection in each critical path to which delay can be added.

15. The method as recited in claim 11, wherein the method operations are performed by a computer program when executed by one or more processors, the computer program being embedded in a non-transitory computer-readable storage medium.

16. A method for reducing simultaneous switching noise (SSN) in an integrated circuit (IC) designed with a computer aided design (CAD) tool, the method comprising:
- calculating desired switching times for each I/O pin in an I/O block;
- determining which pin is associated with each desired switching time in order of desired switching time, wherein determining which pin includes, selecting a pin that has a lowest maximum path delay from candidate pins that can switch at the desired switching time when there is at least one candidate pin where the desired switching time is between a minimum and a maximum path delay for the at least one candidate pin, the candidate pins being those pins that are unselected, and
- selecting a pin with the lowest maximum path delay from the candidate pins when the desired switching time is not between the minimum and the maximum path delay of any candidate pin; and
- setting the switching time for each pin as a closest time to the desired switching time that is between the minimum and the maximum path delay for the each pin, wherein the method operations are performed by a processor.

17. The method as recited in claim 16, further including:
- determining which pin has a highest SSN; and
- making the determined pin break out closer to the IC in a board where the IC is located.

18. The method as recited in claim 16, further including:
- calculating for each pin an amount of delay needed to achieve the set switching time for the pin; and
- traversing each routing element in a path to each pin and add delay if possible up to the calculated amount of delay.

19. The method as recited in claim 18, further including:
- updating timing graphs for any path that was changed during the traversing.

20. The method as recited in claim 16, wherein the method operations are performed by a computer program when executed by one or more processors, the computer program being embedded in a non-transitory computer-readable storage medium.

* * * * *